United States Patent [19]

Seunik et al.

[11] Patent Number: 4,759,029
[45] Date of Patent: Jul. 19, 1988

[54] GAS LASER WITH DIFFERENT POSITIONAL DEPENDENT MUTUAL SPACINGS BETWEEN THE ELECTRODES

[75] Inventors: Horst Seunik, Munich; Gerd Herziger, Rossdorf; Helmut Schuelke, Dieburg; Klemens Schmitt, Rothenbach; Rolf Wester, Aachen-Eilendorf, all of Fed. Rep. of Germany

[73] Assignee: Siemens Aktiengesellschaft, Berlin and Munich, Fed. Rep. of Germany

[21] Appl. No.: 878,824

[22] Filed: Jun. 26, 1986

[30] Foreign Application Priority Data

Jul. 1, 1985 [DE] Fed. Rep. of Germany ....... 3523519

[51] Int. Cl.4 ............................................. H01S 3/097
[52] U.S. Cl. ........................................ 372/82; 372/87
[58] Field of Search ...................... 372/82, 84, 87, 69, 372/70, 34, 55, 83

[56] References Cited

U.S. PATENT DOCUMENTS 4,217,560 8/1980 Kosyrev et al. ..................... 372/87
4,523,320 6/1985 Stappaerts ........................... 372/87

FOREIGN PATENT DOCUMENTS 3327257 2/1984 Fed. Rep. of Germany .
2126777 3/1984 United Kingdom .

OTHER PUBLICATIONS

Marcuvits, Editor, Waveguide Handbook, McGraw Hill, 1951, pp. 400-401.
RCA Review, Mar. 2, 1953, pp. 72-98; C. L. Cuccia; "The Electron Coupler-A Development Tube for Amplitude Modulation and Power Control at Ultra-High Frequency".
Meinke-Gundlach entitled "Taschenbuch der HF-Technik, 1968, pp. 340-371.

Primary Examiner—James W. Davie
Assistant Examiner—B. Randolph
Attorney, Agent, or Firm—Hill, Van Santen, Steadman & Simpson

[57] ABSTRACT

A gas laser which has transverse high frequency exitation and which is improved in efficiency and in power density by the use of a coupling structure which assures a roughly positional independent electrical field strength for each neutral particle density in the full discharge space and this is accomplished with capacitance electrodes (2) between which the discharge space of a laser are arranged in a cavity resonator and wherein the mutual spacings between the capacitive electrodes (2) are positionally dependent and are selected such that they assure that an electrical field strength proportional to the neutral particle density occurs.

11 Claims, 3 Drawing Sheets

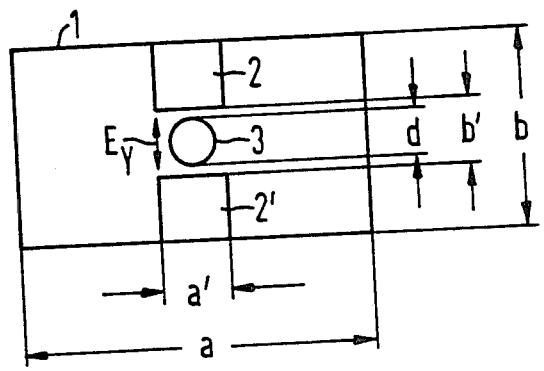
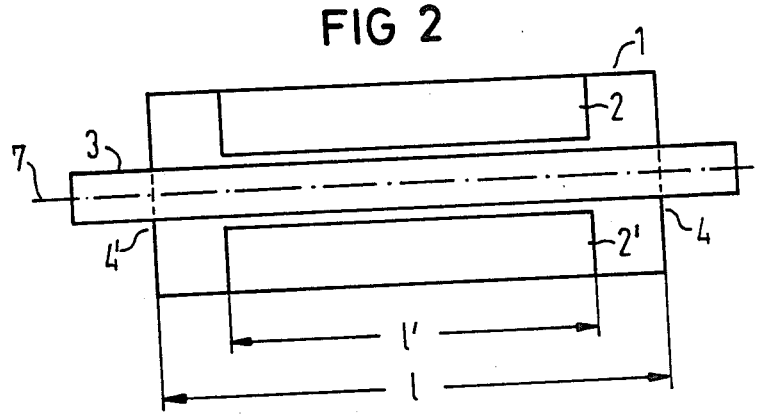
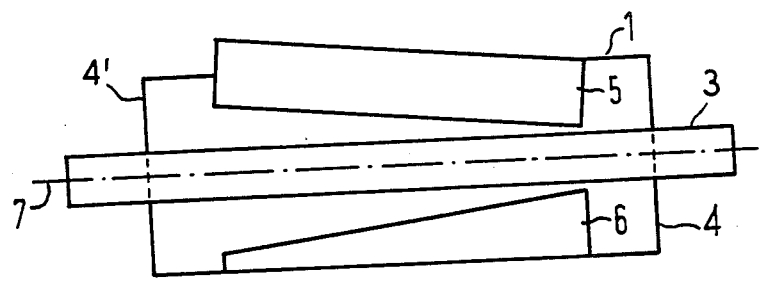

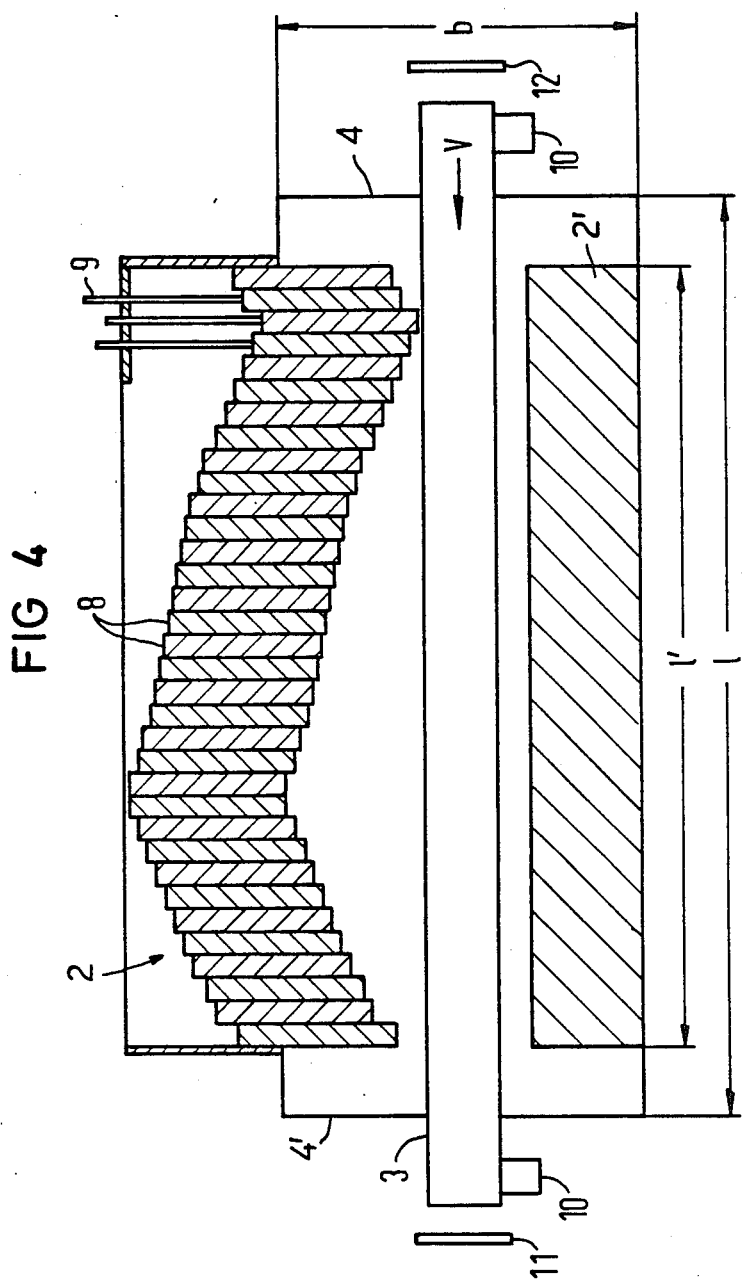

GAS LASER WITH DIFFERENT POSITIONAL DEPENDENT MUTUAL SPACINGS BETWEEN THE ELECTRODES

BACKGROUND OF THE INVENTION

1. Field of the Invention

This invention relates in general to a gas laser arrangement and particularly to a gas laser arrangement in which two capacitive electrodes are opposite one another and are supplied with a high frequency alternating voltage so as to excite a gas discharge and wherein the optical axis of the laser is parallel to the capacitive electrodes and a transverse end coupling of an energy occurs into the discharge space between the capacitive electrodes.

2. Description of the Prior Art

An article by C. L. Cuccia appearing in the RCA Review of March 1953, pages 72 through 98 discloses that the modulation of an electron beam can achieve extremely high values when capacitive electrodes are arranged in a cavity resonator in the vicinity of the electron beam and the voltage at the capacitive electrodes is utilized for modulating the electrons which are retarded.

SUMMARY OF THE INVENTION

It is an object of the present invention to provide for stabilization and increase in the efficiency of the pump power density. In other words, of the coupled-in RF-power per volume of the laser discharge of a gas laser arrangement in which at least two capacitive electrodes are arranged opposite each other and are electrically connected to a high frequency alternating voltage and excite a gas discharge and the optical axis of the laser is parallel to the capacitive electrodes and the transverse in-coupling occurs into the discharge space between the capacitive electrodes and the capacitive electrodes are mounted in a cavity resonator with the resonant frequency of the cavity resonator being tuned to a mode frequency which lies in the UHF range and has a radial component of the electrical field and at least one of the capacitive electrodes has a profile with respect to the other capacitive electrode which is opposite to it relative to the laser discharge and such profile comprises different position dependent spacings with respect to the capacitive electrode which lies opposite and such spacings are selected such that the electrical field strength per neutral particle density is at least approximately positionally independent in the discharge space.

In such a gas laser arrangement, the actual laser is advantageously flashed in a known manner as an optical resonator. The present invention differs from the prior art in that the structure of the cavity resonator which surrounds the discharge space of the laser is driven with the excitation frequency of the laser at the resonant frequency. The cavity resonator feeds the capacitive electrodes with RF energy at a high frequency and the capacitive electrodes concentrate the existing transverse electrical field in the gas discharge space which results in substantial advantages of the drive of the laser discharge of the invention. According to further features of the invention, however, the laser discharge must be excited at different degrees in the discharge space depending on the location so as to first avoid instabilities which arise when too high of field strength per neutral particle density occurs and second to optimally achieve the maximum allowable field strength in the overall excitation range and, thus, to achieve a high yield of laser light.

It has been shown that the laser discharge occurs only at the end of the discharge space with UHF excitation with known in-coupling structures. The inventors have discovered that this phenomena is to be attributed to a considerable location dependent density variation during the re-excitation which does not appear to a comparable degree at lower frequencies up to about 30 kHz. A frequency dependency of the absorption in the medium occurs. These effects can be compensated by the gas laser arrangement.

The location dependent neutral particle density can be calculated as known from the location dependent values for pressure and temperature whereby the location dependent values for pressure and temperature can be measured with standard probes. The location dependent field strength in the transverse direction can also be measured with known probes.

A particular advantage of the invention is that the laser is convectionally cooled and location dependent mutually different spacings of the capacitive electrodes exist in the flow direction of the laser. For this case, a considerable additional density variation of the laser gas which is essentially produced by the temperature rise during passage and due to friction on the walls is compensated for and a high laser light yield is thus obtained. In this application, convectionally cooled lasers comprise all types of cooling in which the laser gas is transported out of the discharge space for cooling.

The gas laser arrangement advantageously contains a $CO_2$ laser gas whereb $H_{101}$ mode is excited in the cavity resonator and where the excitation frequency lies between 200 MHz and 800 MHz. A simple structure is obtained where the laser gas is accommodated in an insulating tube and the flow of the laser gas is in the longitudinal direction and occurs in the direction of the optical axis of the laser. A particular compact embodiment results in that the flow of the laser gas is in the transverse direction.

A gas laser arrangement of the invention wherein at least one of the capacitive electrodes is divided into a plurality of subelectrodes in the flow direction of the laser gas can be simply adjusted. The subelectrodes are advantageously moveable so as to set different spacings relative to the other capacitive electrode which lies opposite to it. Inasmuch as the required spacings are known with adequate precision as a function of the location, continuous correspondingly shaped capacitive electrodes can also be utilized in the invention.

Since only a fine adjustment of the field distribution is required for the excitation of the laser gas, the subelectrodes can advantageously comprise end faces which face the laser discharge and which are inclined relative to the capacitive electrode lying opposite and which roughly stimulate the anticipated change of the spacing relative to the neighboring subelectrode. The end faces of the subelectrodes can therefore be planar or can already be adapted to the location function of the spacings of the cooperating electrode.

The pump power in the UHF range is advantageously coupled into the cavity resonator with a coupling loop where the coupling loop is arranged in the middle of the resonator in the direction of the flow of the laser gas.

A laser gas arrangement in the invention for a standard $CO_2$ laser gas and for excitation with a frequency of about 500 MHz has the features that the cavity resonator has a cuboid shape and the laser gas flows longitudinally through a glass tube having a diameter of about 25 mm to 30 mm and the length of the resonator space in the direction of the tube is about 45 mm and its dimension in the direction of the electrical field of the capacitive electrodes is about 130 mm and its dimension perpendicular to the direction of the electrical field is 300 mm and wherein the limiting surfaces of the cuboid are perpendicular to the defined directions. The $H_{101}$ mode is excited using the above dimensions.

An optimization of the gas discharge with respect to stability and efficiency which is adequate for many applications is achieved when the laser discharge along the flow direction of the laser gas is set to a constant brightness by means of variation of the location related spacings of the capacitive electrodes.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a sectional schematic view through a waveguide;

FIG. 2 is a side sectional view of the structure illustrated in FIG. 1;

FIG. 3 illustrates a side view of a modified form of the invention;

FIG. 4 is a side sectional view illustrating the invention;

DESCRIPTION OF THE PREFERRED EMBODIMENTS

Figure 5:
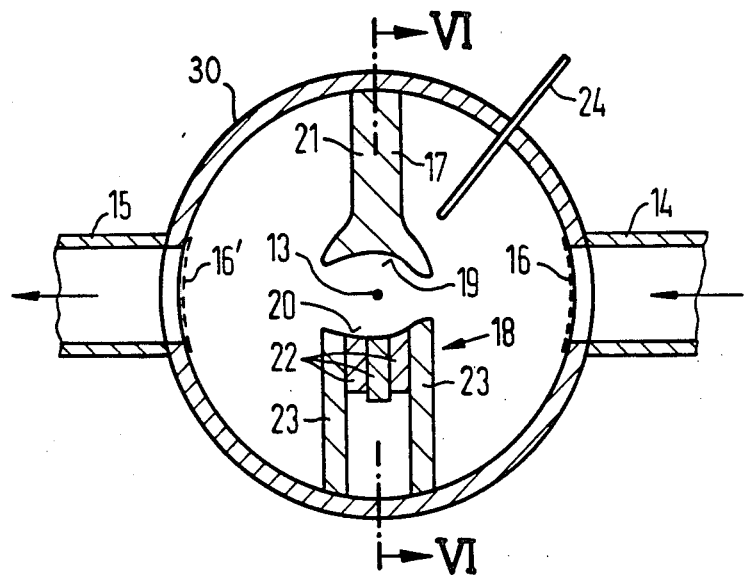
FIG. 5 is a sectional view through a cylindrical waveguide in which the invention is illustrated.

The gas laser arrangement contains a cavity resonator which comprises a rectangular waveguide 1 which has a length which is short circuited at both ends by conductive ends 4 and 4'. The rectangular waveguide has two web-like capacitive electrodes 2 and 2' which have lengths of l'. A discharge tube 3 extends through the rectangular waveguide at the end faces 4 and 4' and is arranged between the capacitive electrodes 2 and 2' and is coaxial with the longitudinal axis of the resonator 1 as shown for example, in FIGS. 1 and 2. The transverse electrical field strength $E_y$ can be varied by varying the mutual spacing between the capacitive electrodes 2 and 2'. A field variation along the longitudinal axis 7 of the resonator can be accomplished by means of a mutually inclined arrangement of the capacitive electrodes such as 5 and 6 illustrated in FIG. 3. The discharge tube 3 is expanded to form an optical resonator using a standard arrangement of mirrors 11 and 12 of a known type illustrated in FIG. 4 and includes pump connections 10 illustrated in FIG. 4.

RF energy in the UHF range can be coupled according to the invention into a laser gas with high efficiency with a cavity resonator described and illustrated. Laser excitation in the UHF range has the advantage that due to amplitude modulation of the pump power the gas discharge can be excitedly pulsed with a higher frequency than with a comparable system in the HF range, in other words, under 30 MHz. In contrast to the later frequency range, however, a high power laser discharge cannot be excited in the UHF range with capacitive transverse energy coupled into the device in the prior art.

For a $CO_2$ laser, the in-coupling of the energy in the invention can be advantageously utilized in a frequency range from 200 MHz to 800 MHz. The laser gas of the $CO_2$ laser is thereby advantageously composed of $He$:$CO_2$:$N_2$ with the volume ratios being 8:1:1.

A gas laser of the above-described type must have substantial cooling at high power. This occurs by convection, in other words, the laser gas is pumped through the laser tube at high speed and if necessary is conducted through a separate heat exchanger. When the laser gas is passing through the laser tube during operation, it is rapidly heated and it expands and the neutral particle density decreases in the flow direction of the laser gas. The recognition of this phenomena by the inventors resulted in the development of the preferred embodiment of the invention according to FIG. 4 wherein at least one of the capacitive electrodes 2 and 2' is divided into a series of subelectrodes 8 and these subelectrodes are arranged so that they have different spacings from the capacitive electrode 2' which lies opposite to the electrode 2. The field strength can thereby be varied proportional to the length related neutral particle density. Retaining rods 9 can be attached to some or all of the subelectrodes 8 and extend through the wall of the waveguide 1 and can be used to adjust the position of the subelectrodes 8 so that their spacing relative to the capacitive electrode 2' lying opposite can be adjusted.

The curve of the neutral particle density in the flow direction V of the laser gas can, for example, be calculated from the temperature distribution in the laser tube and the field distribution can then be set to be proportional to the neutral particle density by using appropriate spacings of the subelectrodes 8 from the capacitive electrode 2' which lies opposite them. An adequate homogenization is achieved for many applications, however, when the laser discharge is set to the same brightness in the region of the various subelectrodes.

The dimensioning of the cavity resonator is based on the laws of waveguide theory and can be implemented according to the following particulars for a cuboid cavity resonator whereby the dimensions used are those illustrated in FIGS. 1 and 2.

The resonator frequency of the capacitively loaded resonator is established by the ratio of the side lengths a'/a and b'/b and by the absolute values of the side dimensions and by the lengths l and l'.

The resonator frequency $f_{RH10p}$ of the $H_{10P}$ mode is defined by the equations $$l = p \frac{\lambda_{gH10}}{2} \quad (1)$$

$p = 1, 2, 3, \ldots$
$l$ = length of the resonator
$\lambda_{gH10}$ = waveguide wavelength of the $H_{10}$ mode (fundamental mode) and $$\lambda_{gH10} = \frac{c}{f_{RH10P} \cdot [1 - (c/(f_{RH10P} \cdot c_{H10}))^2]^{\frac{1}{2}}} \quad (2)$$

$c$ = speed of light
$\lambda_{cH10}$ = limit wavelength of the $H_{10}$ mode.

-continued $$f_{cH10} = c/\lambda_{cH10} \quad (3)$$

is valid for the limit frequency $f_{cH10}$ of the $H_{10}$ mode. From equations (1), (2) and (3), $$f_{RH10P} = \frac{c \cdot p}{2 \cdot l}\left[1 + \left(\frac{2l \cdot f_{cH10}}{p \cdot c}\right)^2\right]^{\frac{1}{2}} \quad (4)$$

results for the resonant frequency.

The values for the limit wavelength $\lambda_{cH10}$ using various side ratios a'/a, b'/b can be numerically calculated. See for example, the publication N. Marcuvitz, editor, Waveguide Handbook, McGraw Hill of 1951, page 400 and are tabularly presented on the bottom of page 400 through 401 in this Waveguide Handbook and are graphically presented on page 340 in the publication by H. Meinke and F. W. Gundlach entitled "Taschenbuch der Hochfrequenztechnik" Springer-Verlag of 1968.

The fundamental mode of the resonator is the $H_{101}$ mode. The field distribution of this mode is an unloaded resonator which is shown on page 469 in the Meinke and Gundlach publication entitled "Taschenbuch der Hochfrequenztechnik". Due to the capacitive webs or ridges in the resonator, the electrical field strength $E_y$ in the region of the resonator axis is increased and the limit frequency $f_{cH10}$ is reduced with unaltered outside dimensions. See also page 340 in the Meinke/Gundlach publication previously cited.

A further reduction of the resonant frequency is produced by introducing the discharge tube into the resonator and this reduction depends on the dimensions of the discharge vessel as well as on the positioning within the resonator and on the dielectric of the discharge vessel. Also, the resonant behaviour is defined by the parameters if the gas discharges within the tube.

The dimensions of a preferred resonator which has been constructed and built are:
a=300 mm
a'=78 mm
b=130 mm
b'=50 mm
l=415 mm
l'=340 mm The resonant frequency $f_{RH101}$ falls at about 500 MHz (for a resonator without the glass tube).

Figure 6:
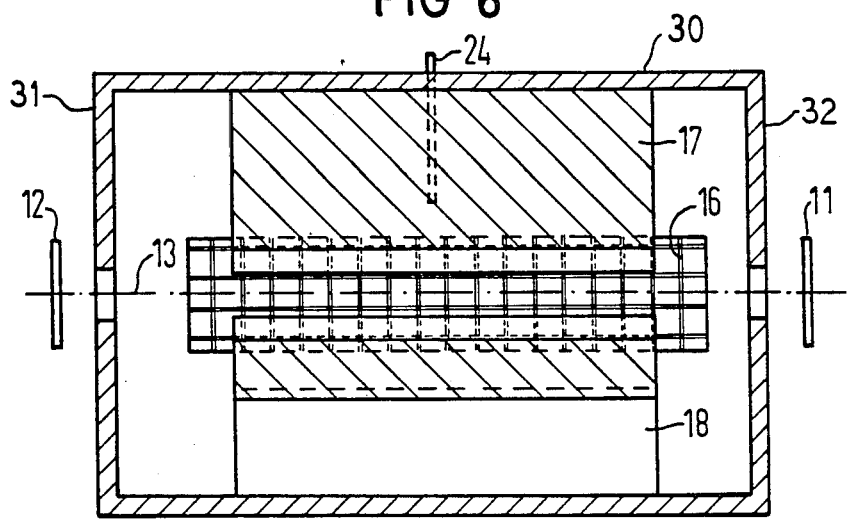
FIG. 6 is a sectional view taken on line VI—VI from FIG. 5.

A particularly compact embodiment of the invention is illustrated in FIGS. 5 and 6 wherein FIG. 6 is a sectional view taken on line VI—VI in FIG. 5. A cavity resonator 30 is fashioned as a cylinder and has end walls 31 and 32. The flow direction of the laser gas is in the direction of the arrow in FIG. 5 and this direction is at right angles to the optical axis 13 of the laser. The laser gas is supplied to the cavity resonator 30 with a delivery conduit 14 having a rectangular cross-section and is discharged from the cavity through an outlet conduit 15 which has a rectangular cross-section. Both of the conduits 14 and 15 are connected to the interior of the cavity resonator 30 with gas permeable wall portions 16 and 16' as illustrated in FIG. 5. The member 16 and 16' are preferably formed of wire mesh. The gas permeable wall partitions 16 and 16' allow gas delivery without undue disturbance of the electrical magnetic resonant oscillations in the cavity resonator. With this construction, the $H_{111}$ mode is excited as the fundamental mode. Compare the publication by Meinke and Gundlach "Taschenbuch der Hochfrequenztechnik", Volume 68 at page 470.

The capacitive electrodes 17 and 18 have end faces adjacent each other which have different positionally dependent spacings from each other in the flow direction of the laser gas and which assure a positionally independent value of the electrical field strength in the laser discharge relative to the neutral particle density. The end faces 19 and 20 of the electrodes 17 and 18 limit the region of the laser discharge.

The capacitive electrode 17 includes a tapered portion 21 which is behind the end face 19 so as to allow less material to be utilized in constructing the part. This embodiment is suitable for invariable profiles of the end face 19 of the electrode 17. The opposite capacitive electrode 18 is composed of a plurality of differently shaped subelectrodes 22 and 23 and the subelectrodes 23 hold the subelectrode portions 22 in fixed positions. The end faces of the subelectrodes 22 and 23 facing the capacitive electrode 17 are adapted to be moved so that they can be set predetermined desired distances from the end face 19 of the capacitive electrode 17. A fine adjustment of the topical dependence of the spaces from the end face 17 can be undertaken by a parallel movement of the subelectrodes 23. Thus, in other words, in FIGS. 5 and 6, the subelectrodes portions 22 of which three are shown in FIG. 5 can be pushed into or pulled out of the region between the subelectrodes 23 so as to vary the distance between the capacitive electrode 18 and the capacitive electrode 17.

Assuming adequate fixed excitation conditions, the electrode 18 could also be constructed similar to the electrodes 17. Also, the subelectrodes 23 could be extended through the outside wall of the resonator 30 so that they can be independently adjusted from the outside of the resonator.

The mirrors 11 and 12 are designed in the conventional manner and are set to an optical resonance of the laser discharge along the optical axis 13. The UHF energy is coupled in by a coupling rod 24 which is shaped in a known manner according to the prior art and is arranged roughly in the middle of the cavity resonator in the direction of the optical axis of the laser.

As is clearly shown in FIGS. 1, 2, 3, 4, 5 and 6, the electrodes 2, 2', 5, 6, 17 and 18 are formed of electrically conducting material and are electrically connected to the electrically conducting sidewalls of the cavities 1 and 30. Thus the oppositely mounted electrodes are not insulated from each other but are both electrically connected to the walls of the cavity. This is the reason they are defined as "capacitive electrodes".

Although the invention has been described with respect to preferred embodiments, it is not to be so limited as changes and modifications can be made which are within the full intended scope of the invention as defined by the appended claims.

We claim as our invention:
1. A gas laser comprising:
an electrical conducting cavity resonator tuned to a mode frequency in the UHF band,
means for passing gas through said cavity resonator which produces laser action,
means for coupling UHF energy into said cavity resonator,
a first electrically conductive capacitive electrode with a first edge attached to and electrically connected to the inside wall of said cavity resonator and extending inwardly toward the center axis of said cavity resonator and having a second edge which terminates adjacent said center axis, a second electrically conductive capacitive electrode with a first edge attached to and electrically attached to the inside wall of said cavity resonator at a position opposite the connection point of said first capacitive electrode and extending inwardly toward the second edge of said first capacitive electrode and its second edge terminating adjacent said center axis of said cavity resonator and the second edge of at least said second capacitive electrode has a shaped profile such that at different positions of said second edge along said center axis of said cavity resonator it has different distances from said center axis.

2. A gas discharge laser according to claim 1, characterized in that the laser is convectionally cooled; and in that different, positional dependant mutual spacings between the capacitive electrodes occur in the flow direction of the laser gas.

3. A gas laser arrangement according to claim 1 or 2 characterized in a $CO_2$ laser that is excited by the electrical field of the $H_{101}$ mode is mounted in the cavity resonator; and in that the excitation frequency lies between 200 MHz and 800 MHz.

4. A gas laser arrangement according to claims 1 or 2, characterized in that at least one of the capacitive electrodes is divided into a plurality of sub-electrodes in the direction of the center axis.

5. A gas laser arrangement according to claim 4, characterized in that the sub-electrodes are constructed so that they are moveable for setting different spacings relative to the capacitive electrode which is mounted opposite.

6. A gas laser arrangement according to claim 5, characterized in that said sub-electrodes have end faces which face the laser discharge and which are inclined relative to the capacitive electrode which is mounted opposite and which approximately simulate the required change of spacing from the neighboring sub-electrode.

7. A gas laser arrangement according to claims 1 or 2, characterized in that UHF energy is coupled into the cavity resonator with a coupling means (24), mounted in the middle of the longitudinal dimension (l) of the resonator.

8. A gas laser arrangement according to claim 1 or 2, characterized in that the cavity resonator has a cuboid shape; and the laser gas flows longitudinally through a glass tube having an outside diameter in the range of 25 mm to 30 mm, and in the length of the resonator space in the direction of the tube is 415 mm, and its width in the direction of the electrical field of the capacitive electrodes is 130 mm and its dimension in a direction perpendicular to the width is 300 mm, and the limiting surfaces of the cuboid are perpendicular to the width.

9. A gas discharge arrangement according to claim 1 or 2 characterized in that the laser discharge in the flow direction of the laser gas is set to have a constant brightness by varying the location-related spacings of the capacitive electrodes.

10. A gas laser arrangement according to claim 2, characterized in that the flow direction of the laser gas is approximately perpendicular to the optical axis of the laser, and the laser gas is supplied into the cavity resonator or, respectively, drawn out of the cavity resonator through gas-permeable wall members.

11. A gas laser arrangement according to claim 10, characterized in that a coupling pin is mounted and arranged in the direction of the optical axis in the middle of the resonator for coupling UHF energy into the cavity resonator.

* * * * *